J. C. A. ANDERSON.
SAFETY RECORDING DEVICE.
APPLICATION FILED JULY 23, 1912.
1,168,370.
Patented Jan. 18, 1916.
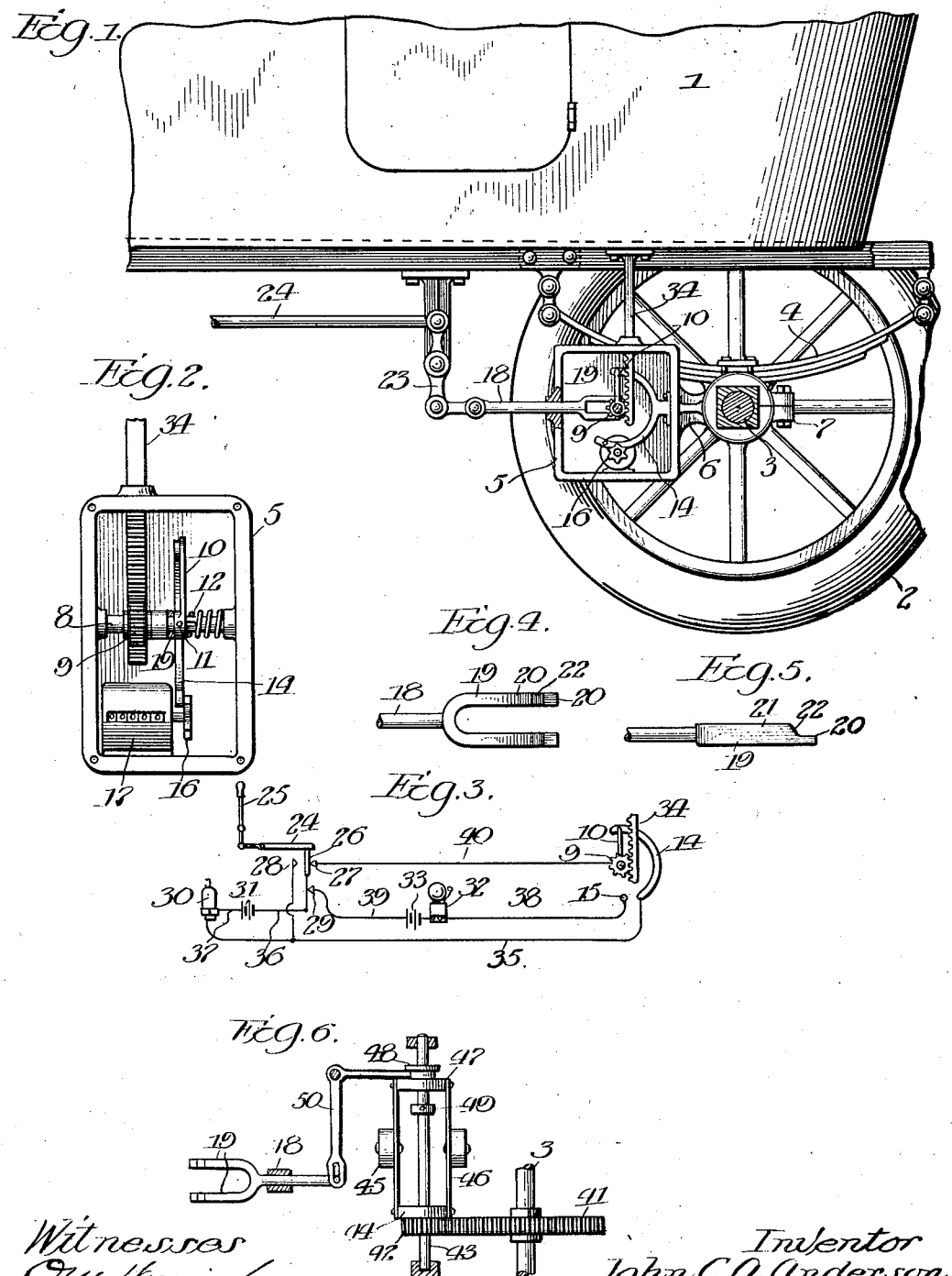

UNITED STATES PATENT OFFICE.

JOHN C. A. ANDERSON, OF CHICAGO, ILLINOIS, ASSIGNOR, BY DIRECT AND MESNE ASSIGNMENTS, TO EVERETT V. WATSON, OF FISHKILL-ON-THE-HUDSON, NEW YORK.

SAFETY RECORDING DEVICE.

1,168,370.  Specification of Letters Patent. Patented Jan. 18, 1916.

Application filed July 23, 1912. Serial No. 711,151.

*To all whom it may concern:*

Be it known that I, JOHN C. A. ANDERSON, a citizen of the United States, residing at Chicago, in the county of Cook and State of Illinois, have invented a certain new and useful Improvement in Safety Recording Devices, of which the following is a full, clear, concise, and exact description, reference being had to the accompanying drawings, forming a part of this specification.

My invention relates to vehicle safety devices and is of particular utility in connection with vehicles.

My invention is of special utility in connection with automobiles and more particularly automobile trucks.

I will describe in this connection my invention as applied more particularly to an automobile truck, its application being readily deducible from the description of this one embodiment of my invention. Automobile trucks similar to other vehicles are usually built or designed for a particular load and when this load is exceeded the parts are naturally unduly strained and more likely to break or rapidly deteriorate. In the sale of automobile trucks it is also customary to guarantee these trucks for a certain period of time, and of course this guarantee is subject to the machine not being overloaded. It is ordinarily quite impossible for the seller to know when the machine has been overloaded and whether a failure of the machine may be traced to the failure due to ordinary tear and wear, or to the overloading of the machine. It is therefore of great importance that some suitable safety device, preferably in connection with a recording device, be employed in order to have some suitable record or indication of the conditions under which the car has been operating.

In accordance with my invention I provide suitable mechanism upon an automobile truck which is responsive to the weight carried by the truck. This device is so arranged that it registers once each time the car is overloaded. This device is also of such a character that it prevents movement of the truck should the weight at starting be in excess of that permitted. If the weight on the car is normal, the machine may be started. Of course, during movement of the machine, jolting may operate the device to the same distance that an excess load would operate the device when the car is stationary, but after once starting the device no longer operates to control the movement of the car.

I will explain the above mentioned embodiment of my invention more particularly in connection with the accompanying drawing illustrating the same, in which:

Figure 1 is a side view partly in section of a portion of a truck having my improved device in place; Fig. 2 is a front view of the device, a portion thereof being in section; Fig. 3 is a diagrammatic view illustrating circuit connections, Figs. 4 and 5 are top and side views respectively of a bifurcated controlling member, and Fig. 6 is a view of a modified form of my invention.

Referring more specifically to Fig. 1, I illustrate a car body 1, one rear wheel 2 also being shown. The rear wheel is mounted upon an axle 3. A spring 4 is interposed between the car body and the axle. It will be seen thus that relative motion between the axle 3 and the car body 1 takes place by reason of the movement of the spring 4 in accordance with the amount of weight placed upon the body 1. My device is then interposed between these two relatively movable portions of the machine so that the device is actuated in response to the changing weight.

My improved device consists of a casing 5 which by means of the arms 6, 6 is fixedly secured to the axle 3 by means of the bolt 7. Within the casing 5 there is a shaft 8 carrying a pinion 9. This pinion is fastened to the shaft 8. Splined to the shaft 8 and therefore rotatable therewith is a pointer 10, a pin 11 coöperating with the slot 12 in the shaft to insure the rotation of this indicator 10 with the shaft 8, at the same time permitting longitudinal movement of this indicator lengthwise of said shaft. A distance piece 13 is provided on said shaft abutting preferably against the pinion 9. The indicator 10 operates over a suitable scale 14 to indicate the weight on the car. This scale 14 preferably forms a segmental electrical contact as more clearly shown in Fig. 3, a further contact 15 being provided also being adapted to be engaged by the indicator 10 for purposes presently to be explained. In the path of the indicator 10 there is likewise a toothed wheel 16 which is associated with a counting mechanism 17, Whenever the indicator 10 is thus moved over its scale beyond the weight limit allowed the indicator 10 operates the toothed wheel to register one unit to thereby indicate an overloading of the car. The counter 17 thus keeps a record of the number of times that the car is overloaded. Likewise when the weight limit is exceeded, the pointer 10 engages the contact 15, the results of which will be presently explained.

A bifurcated controlling arm 18 having the tines 19, 19 projects through the casing 5. The tines 19, 19 are on opposite sides of the shaft 8 and project between the distance piece and the hub of the indicator 10. As more clearly shown in Figs. 4 and 5, these tines 19, 19 have a thin section 20 and a thicker section 21 which are united by the inclined portion 22. Normally, when the car is stationary the portions 20 are between the hub of the indicator 10 and the distance piece 13. As soon as the car is started, the tines are moved to the rear (Fig. 1) so that the thicker portions 21 of the tines are between the elements 13 and 10, whereby the indicator is moved away from contact with the segmental scale 14 and is thrown out of line of the toothed wheel 16. Thus when the car is in motion the jolts of the car which would move the indicator 10 have no effect so far as registration is concerned, nor any effect so far as an alarm is concerned. The arm 18 is operated by means of a link 23 with a bar 24 extending to the starting lever of the machine so that when the machine is standing still, the indicator 10 rests against the element 14 and immediately the car is started, after the starting lever has been moved, the indicator 10 is moved to the right (Fig. 2) and no longer performs the functions which it performs when the car is standing still.

Referring more specifically to Fig. 3, the starting lever 25 of the car is shown as associated with the arm 24. This arm 24 likewise carries a switch element 26 adapted for association with switch contacts 27, 28 and 29. A spark plug 30 is also shown together with a battery 31 therefor. An alarm 32 is provided together with a battery 33 therefor. A rack 34 is fastened to the car body 1 and projects through the casing 5 in such a manner that this rack engages the pinion 9 to rotate said pinion in accordance with the relative movement between the parts 1 and 3.

Referring now to Fig. 3, the electrical connections will be clear, in that the segmental contact 14 is connected by means of the conductor 35 with one terminal of the spark plug and also with the contact 28. The switch element 26 is connected by means of conductor 36 to one terminal of the battery 13, a conductor 37 connecting the other terminal of said battery with the spark plug. A conductor 38 connects the contact 15 with the signal 32, the other terminal of said signal being connected with one terminal of the battery 33 and the other terminal of said battery being connected by means of the conductor 39 with the contact 29. A conductor 40 connects the indicator 10 with the contact 26.

Assuming the car to be standing still as shown by the arrangements of Fig. 3, then the indicator 10 moves to indicate the weight in response to the movement of the rack 34. The engine may be running in the meantime as the circuit through the spark plug is from the contact 14, conductor 35, spark plug 30, conductor 37, battery 31, conductor 36, switch element 26, contact 27, conductor 40, indicator 10 to the segment 14. Now should the weight on the car be increased beyond that allowable, then the indicator 10 leaves the contact 14, thereby breaking the connection to the spark plug and thus rendering it impossible to start the machine, and at the same time sounding the alarm 32 as the indicator has then engaged the contact 15, thereby completing the circuit through the signal 32. The weight on the car will thereupon be reduced so as to permit the same to start. Now however, should the car be fully loaded without exceeding the weight limit, then the initial movement of the starting lever 25 causes the indicator 10 to be moved away from association with the switch elements 14 and 15, and likewise to be out of alinement with the counting wheel 16. At the same time that this is taking place, the switching element 26 has moved over into contact with the contact element 28 so that the circuit of the spark plug is complete independently of the indicator 10. It will thus be seen that after the car has started, jolting of the car sufficient to move the indicator 10 beyond the segment 14 will neither sound an alarm nor register an overweight.

In Fig. 6 I set forth another form which my invention may take which would be of use should it be desired to anticipate a contingency in which the power is entirely shut off and the machine is coasting, under which conditions it should also be possible to have the excess load indicating device cut out of service. Under these conditions the connection to the shaft 3 and gear wheel 41 which meshes with pinions 42 provided upon a shaft 43. The pinions 42 are of course fastened to the shaft 43 and are also fastened to the disk 44 which forms part of a governor mechanism including the balls 45 and springs 46 which are also associated with a slidable disk 47 carrying the collar 48. When the shaft 3 is rotating as when the wheel is in motion, the rotation of the balls 45 causes the contraction of the disk 47 toward the stop 49, thereby rotating the bell crank lever 50 to move the arm 14 carrying the fork having the prongs 19, 19. In this way the indicating mechanism will be at all times cut out when the vehicle is in motion.

The many applications of my invention as above set forth will be apparent from the description of this embodiment thereof.

I do not limit my invention to the precise construction as herein set forth, but

Having thus described one form of carrying out my invention, what I claim as new and desire to secure by Letters Patent is:

1. In a motor driven road vehicle, the combination with the frame and axle, of controlling means interposed between said frame and axle adapted to automatically prevent starting the vehicle, the operation of said means depending upon the distance between the frame and axle, a manually controlled starting device for said vehicle, and operative connections between said starting device and said controlling means for rendering the controlling means inoperative on starting the vehicle with the load permitted.

2. In a motor driven road vehicle, the combination with the frame and axle, of controlling means interposed between said frame and axle adapted to automatically prevent starting the vehicle, the operation of said means depending upon the distance between the frame and axle, and devices for automatically rendering the said controlling means inoperative when the vehicle is in motion.

In witness whereof, I hereunto subscribe my name this 12th day of July A. D., 1912.

JOHN C. A. ANDERSON.

Witnesses:
 OTTO M. WERMICH,
 HAZEL JONES.